(12) United States Patent
Bush

(10) Patent No.: US 7,069,326 B1
(45) Date of Patent: Jun. 27, 2006

(54) SYSTEM AND METHOD FOR EFFICIENTLY MANAGING DATA TRANSPORTS

(75) Inventor: Jeffrey Bush, Palo Alto, CA (US)

(73) Assignee: Danger, Inc., Palo Alto, CA (US)

( * ) Notice: Subject to any disclaimer, the term of this patent is extended or adjusted under 35 U.S.C. 154(b) by 0 days.

(21) Appl. No.: 10/260,063

(22) Filed: Sep. 27, 2002

(51) Int. Cl.
*G06F 15/173* (2006.01)

(52) U.S. Cl. .............. 709/226; 709/220; 709/221; 709/223; 709/224; 709/232; 709/233; 709/234; 709/235

(58) Field of Classification Search .......... 709/226, 709/228, 223, 224, 233
See application file for complete search history.

(56) References Cited

U.S. PATENT DOCUMENTS

| | | | |
|---|---|---|---|
| 4,237,540 A | 12/1980 | Sato | |
| 5,159,592 A | 10/1992 | Perkins | |
| 5,224,060 A | 6/1993 | Ma | |
| 5,268,817 A | 12/1993 | Miyagawa | |
| 5,546,447 A | 8/1996 | Skarbo et al. | |
| 5,548,477 A | 8/1996 | Kumar | |
| 5,548,478 A | 8/1996 | Kumar | |
| 5,559,800 A | 9/1996 | Mousseau et al. | |
| 5,579,472 A | 11/1996 | Keyworth et al. | |
| 5,594,910 A | 1/1997 | Filepp et al. | |
| 5,608,446 A * | 3/1997 | Carr et al. ............. | 725/114 |
| 5,638,257 A | 6/1997 | Kumar | |
| 5,715,387 A | 2/1998 | Barnstijin et al. | |
| 5,727,159 A | 3/1998 | Kikinis | |
| 5,727,202 A | 3/1998 | Kucala | |
| 5,748,084 A | 5/1998 | Isikoff | |
| 5,778,176 A | 7/1998 | Geihs et al. | |
| 5,790,974 A | 8/1998 | Tognazzini | |
| 5,802,312 A | 9/1998 | Lazaridis et al. | |
| 5,816,620 A | 10/1998 | Buell | |
| 5,900,848 A | 5/1999 | Haneda | |
| 5,915,095 A | 6/1999 | Miskowiec | |
| 5,949,408 A | 9/1999 | Kang | |
| 5,961,590 A | 10/1999 | Mendez et al. | |
| 5,964,830 A | 10/1999 | Durrett | |
| 5,969,678 A | 10/1999 | Stewart | |
| 5,983,261 A * | 11/1999 | Riddle ................. | 709/204 |
| 5,987,609 A | 11/1999 | Hasebe | |
| 6,023,708 A | 2/2000 | Mendez et al. | |
| 6,035,339 A | 3/2000 | Agraharam et al. | |

(Continued)

FOREIGN PATENT DOCUMENTS

EP 1 071 024 A2 1/2001

(Continued)

OTHER PUBLICATIONS

Excite Home Page, http://www.excite.com/, 1 page Aug. 1, 2000.

(Continued)

*Primary Examiner*—Bunjob Jaroenchonwanit
*Assistant Examiner*—Dohm Chankong
(74) *Attorney, Agent, or Firm*—Blakely, Sokoloff, Taylor & Zafman, LLP

(57) ABSTRACT

A system is described for allocating bandwidth comprising: a transport layer to support a first socket connection for a first application and a second socket connection for a second application; and a socket prioritization module to allocate relatively more bandwidth to the first socket connection relative to the second socket connection, wherein allocation of bandwidth is based on one or more characteristics of the first application and/or the second application.

17 Claims, 7 Drawing Sheets

U.S. PATENT DOCUMENTS

| | | | |
|---|---|---|---|
| 6,038,601 A * | 3/2000 | Lambert et al. | 709/226 |
| 6,076,093 A | 6/2000 | Pickering | |
| 6,076,109 A | 6/2000 | Kikinis | |
| 6,081,708 A | 6/2000 | Vasnier | |
| 6,087,937 A | 7/2000 | McCarthy | |
| 6,151,677 A | 11/2000 | Walter et al. | |
| 6,157,935 A | 12/2000 | Tran et al. | |
| 6,166,734 A | 12/2000 | Nahi et al. | |
| 6,167,441 A | 12/2000 | Himmel | |
| 6,199,099 B1 | 3/2001 | Gershman et al. | |
| 6,249,530 B1 * | 6/2001 | Blanco et al. | 370/468 |
| 6,266,400 B1 | 7/2001 | Castagna | |
| 6,282,435 B1 | 8/2001 | Wagner | |
| 6,286,063 B1 | 9/2001 | Bolleman et al. | |
| 6,317,789 B1 * | 11/2001 | Rakavy et al. | 709/224 |
| 6,330,618 B1 | 12/2001 | Hawkins et al. | |
| 6,336,137 B1 | 1/2002 | Lee | |
| 6,370,687 B1 | 4/2002 | Shimura | |
| 6,396,482 B1 | 5/2002 | Griffin et al. | |
| 6,418,310 B1 | 7/2002 | Dent | |
| 6,518,533 B1 | 7/2002 | Angelo et al. | |
| 6,433,777 B1 | 8/2002 | Sawyer | |
| 6,438,101 B1 * | 8/2002 | Kalampoukas et al. | 370/229 |
| 6,438,601 B1 | 8/2002 | Hardy | |
| 6,446,004 B1 | 9/2002 | Cao | |
| 6,449,255 B1 * | 9/2002 | Waclawsky | 370/236 |
| 6,490,251 B1 * | 12/2002 | Yin et al. | 370/236.1 |
| 6,493,316 B1 * | 12/2002 | Chapman et al. | 370/231 |
| 6,526,274 B1 | 2/2003 | Fickes et al. | |
| 6,542,730 B1 | 4/2003 | Hosain | |
| 6,590,865 B1 * | 7/2003 | Ibaraki et al. | 370/230 |
| 6,622,175 B1 | 9/2003 | Piller | |
| 6,643,781 B1 | 11/2003 | Merriam | |
| 6,662,023 B1 | 12/2003 | Helle | |
| 6,687,497 B1 | 2/2004 | Parvulescu et al. | |
| 6,742,027 B1 | 5/2004 | Cromer et al. | |
| 6,968,379 B1 * | 11/2005 | Nielsen | 709/226 |
| 2001/0023445 A1 * | 9/2001 | Sundqvist | 709/228 |
| 2002/0002618 A1 * | 1/2002 | Vange | 709/228 |
| 2002/0007545 A1 | 1/2002 | Tarpenning et al. | |
| 2002/0010757 A1 | 1/2002 | Granik et al. | |
| 2002/0075305 A1 | 6/2002 | Beaton et al. | |
| 2002/0150048 A1 * | 10/2002 | Ha et al. | 370/231 |
| 2004/0010585 A1 * | 1/2004 | Jones et al. | 709/224 |

FOREIGN PATENT DOCUMENTS

| | | |
|---|---|---|
| WO | WO 98/36344 A2 | 8/1998 |
| WO | WO 00/30003 | 5/2000 |

OTHER PUBLICATIONS

Alta Vista Home Page, http://www.altavista.com/, 1 Page Aug. 1, 2000.

Yahoo Home Page, http://www.yahoo.com/, 1 page Aug. 1, 2000.

Anita Komlodi, Key Frame Preview Techniques For Video Browsing, Digital Library Research Group, College of Library and Information Services University of Maryland, pp. 118-125.

Appenzeller, et al.., "User-friendly Access Control For Public Network Ports", IEEE, pp. 699-707, Mar. 1999.

IBM Technical Disclosure Bulletin, "Multimedia Telephone Caller Recognition" vol. 34, No. 10A, Mar. 1992, pp. 315-316.

Bickmore, Andreas Girgenshon and Joseph W. Sullivan, Web Page Filtering and Re-Authoring For Mobile Users, The Computer Journal. vol. 42, No. 6, 1999, pp. 534-546.

J.C. Mogul, Server-Directed Transcoding, Computer Communications, Elsevier Science Publishers BV, Amsterdam, Feb. 1, 2001, pp. 155-162.

* cited by examiner

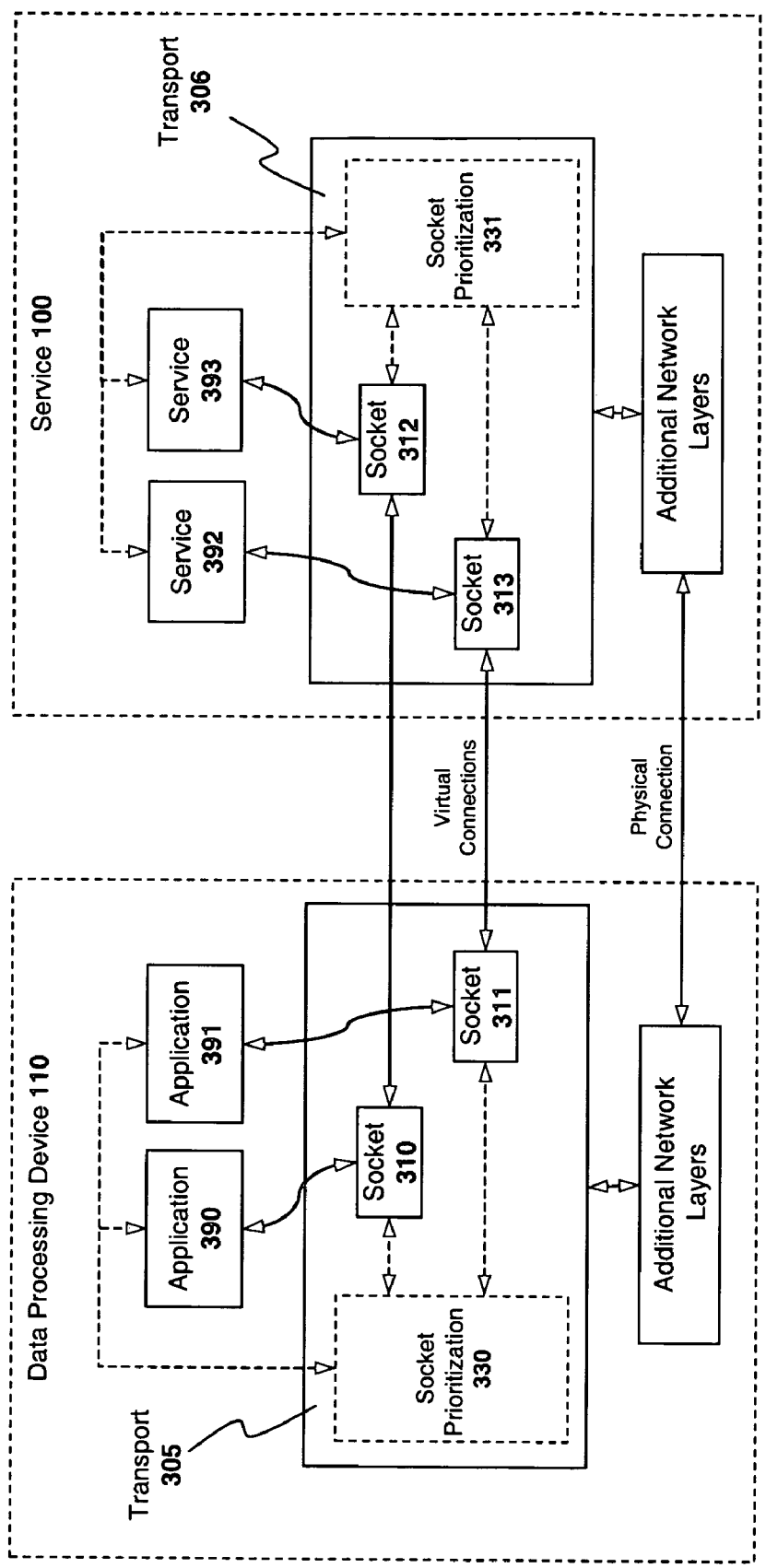

US 7,069,326 B1

SYSTEM AND METHOD FOR EFFICIENTLY MANAGING DATA TRANSPORTS

BACKGROUND

1. Field of the Invention

This invention relates generally to the field of data processing systems. More particularly, the invention relates to a system and method for prioritizing data transports on a data processing device.

2. Description of the Related Art

A typical layered network architecture is illustrated in FIG. 1. Each layer within the architecture performs a specific function to reliably transmit data from a source node 195 (e.g., a client computer) to a destination node 196 (e.g., a network server). For example, when an application 190 has data to transmit to another application 191, the data is processed, in succession by a transport layer 180, a network layer 170 and a data-link layer 160 before being transmitted over the actual physical connection 165 between the two nodes. At the receiving node 196, the data is then processed in reverse order, by the data-link layer 161, the network layer 171, and the transport layer 185 before being handed off to the receiving application 191.

The descriptions below assume that the reader has at least a basic understanding of the functions of each of the network layers. For those interested, a detailed description of the network layers defined by the ISO Open Systems Interconnection model can be found in DILIP C. NAIK, INTERNET STANDARDS AND PROTOCOLS (1998) (see, e.g., Chapter 1, pages 3–11).

The well known TCP/IP protocol ("Transmission Control Protocol/Internet Protocol") operates at the transport and network layers, respectively. The TCP transport layer is responsible for ensuring that all data associated with a particular data transmission arrives reliably and in the correct order at its destination. Specifically, in order to ensure reliable data transmission, a virtual connection 187 (also referred to herein as a "socket connection") is established between a TCP socket 182 opened at the destination transport layer 185 and a TCP socket 181 opened at the source transport layer 180.

The TCP sockets 181, 182 perform flow control to ensure that the data transmitted form the source node is provided to the receiving node at an acceptable data rate. Specifically, a "window" is established defining the amount of outstanding data a source node 195 can send before it receives an acknowledgment back from the receiving node 196 (i.e., indicating that it has successfully received all or a portion of the data).

For example if a pair of nodes 195, 196 are initially communicating over TCP connection that has a TCP window size of 64 KB (kilobytes), the transmitting socket 181 can only send 64 KB of data and then it must stop and wait for an acknowledgment from the receiving socket 182 that some or all of the data has been received. If the receiving socket 182 acknowledges that all of the data has been received then the transmitting socket 181 is free to transmit another 64 KB. If, however, the transmitting socket 181 receives an acknowledgment from the receiver that it only received the first 32 KB (which could happen, for example, if the second 32 KB was still in transit or was lost), then the transmitting socket 181 will only send another 32 KB, since it cannot have more than 64 KB of unacknowledged data outstanding (i.e., the second 32 KB of data plus the third).

Thus, the TCP window throttles the transmission speed based on how quickly the receiving application can process it. The TCP window is typically defined by a 16-bit TCP header field. As such, the largest window that can be used for a standard TCP connection is $2^{16}$ KB (64 KB).

A client may concurrently have several different socket connections open with a server or client, or with several different servers/clients. Each socket connection may not be utilized in the same manner, however. For example, the user may be interactively browsing web pages via one socket connection while receiving an automated software upgrade or e-mail message over another socket connection. This may result in a degradation of the interactive user experience, particularly on networks which allocate a relatively small amount of bandwidth per device (e.g., wireless networks such as Cellular Digital Packet Data and ARDIS networks). Under these circumstances, it would be useful to have the ability to prioritize the socket connections such that the interactive connections are provided with a relatively larger amount of bandwidth than the non-interactive connections.

SUMMARY

A system is described for allocating bandwidth comprising: a transport layer to support a first socket connection for a first application and a second socket connection for a second application; and a socket prioritization module to allocate relatively more bandwidth to the first socket connection relative to the second socket connection, wherein allocation of bandwidth is based on one or more characteristics of the first application and/or the second application.

BRIEF DESCRIPTION OF THE DRAWINGS

A better understanding of the present invention can be obtained from the following detailed description in conjunction with the following drawings, in which:

FIG. 3 illustrates one embodiment of a system for prioritizing socket connections.

DETAILED DESCRIPTION OF PREFERRED EMBODIMENTS

Described below is a system and method for processing code words. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of a Data Processing Service

One embodiment of the invention is employed on a wireless data processing device which operates in conjunction with a data processing service such as that described in co-pending application entitled NETWORK PORTAL SYSTEM, APPARATUS AND METHOD, Ser. No. 09/714,897, Filed Nov. 15, 2000 (hereinafter "Network Portal Application"), which is assigned to the assignee of the present application and which is incorporated herein by reference. Certain aspects of this data processing device and data processing service will now be described, followed by a detailed description of an advanced system and method for processing data object identification codes. As an initial matter, however, it should be noted that the underlying principles of the invention may be implemented on virtually any type of network and between virtually any types of network nodes (e.g., networked desktop computers, networked personal digital assistants, . . . etc).

Figure 1:
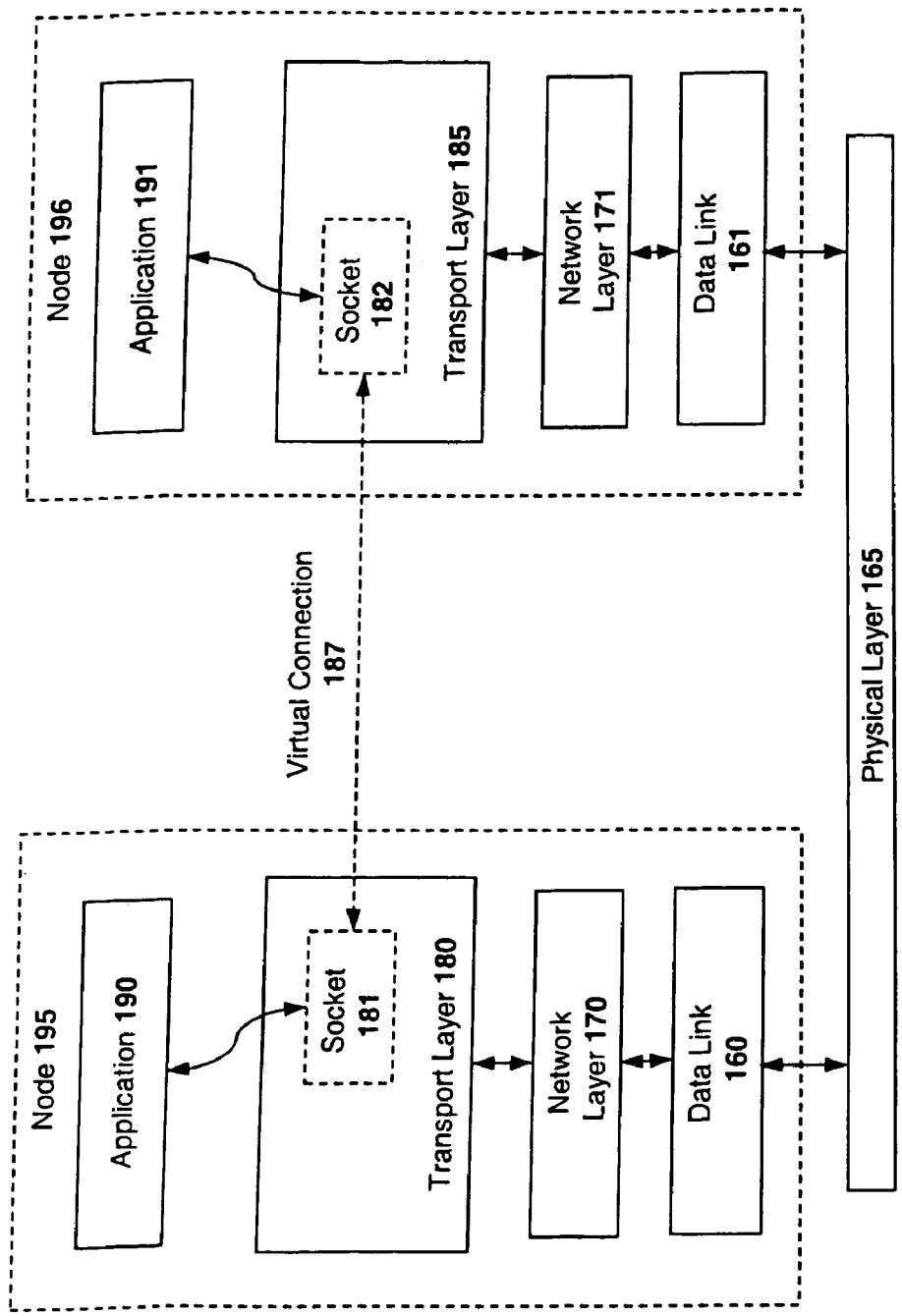
FIG. 1 illustrates an exemplary network architecture with a plurality of network layers.
Figure 2:
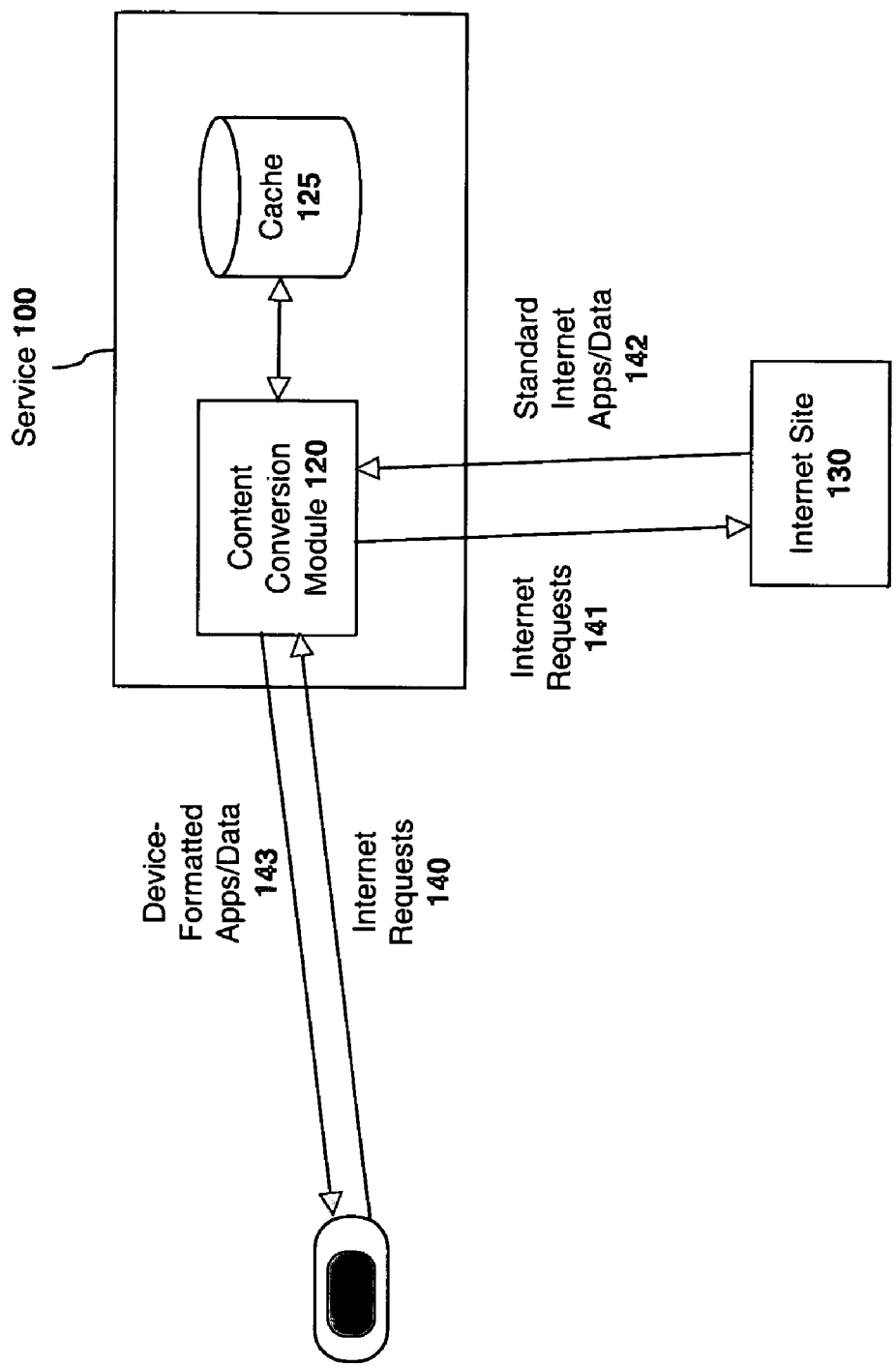
FIG. 2 illustrates an exemplary data processing device communicating with an exemplary data service.

FIG. 2 illustrates one embodiment of a data processing service 100 comprised of one or more servers. The data processing service provides a portal through which data processing devices 110 may access content (e.g., Web pages, multimedia content, e-mail, instant messages . . . etc) from external Internet sites 130. In one embodiment, the service 100 converts standard applications and data into a format which each wireless data processing device 110 can properly interpret. Thus, as illustrated in FIG. 2, one embodiment of the service 100 includes a content conversion module 120 for processing requests for Internet content 140. More particularly, the service 100 acts as a proxy for the data processing device 110, forwarding Internet requests 140, 141 to the appropriate Internet site 130 on behalf of the data processing device 110, receiving responses from the Internet site 130 in a standard Internet format (e.g., Web pages with embedded audio/video and graphical content, e-mail messages with attachments, . . . etc), and converting the standard Internet responses 142 into a format 143 which the data processing device 110 can process (e.g., bytecodes as described in the Network Portal Application).

For example, the conversion module 120 may include a hypertext markup language ("HTML") rendering module (not shown) for interpreting HTML code and downloading any embedded content in the HTML code (e.g., graphics, video, sound, . . . . etc) to the service 100. The conversion module 120 may then combine the HTML code and embedded content and generate a set of bytecodes for accurately reproducing the requested content on the data processing device 110. As described above, in one embodiment, the bytecodes may be Java bytecodes/applets. However, the conversion module 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested Internet content accurately, while at the same time minimizing the bandwidth required to transmit the content to the device 110. For example, the conversion module 120 may perform pre-scaling and color depth adjustments to the requested content so that it will be rendered properly within the data processing device's 110's display. In making these calculations, the conversion may factor in the memory and processing power available on the data processing device 110. In addition, the conversion module 120 may compress the requested content using a variety of compression techniques, and thereby preserve network bandwidth.

In one embodiment, the conversion module 120 will simply discard Internet content which either cannot be reproduced on the data processing device 110, or which the user has indicated that he/she does not want to be reproduced on the wireless device. For example, a user may indicate that he/she does not want sounds to be generated on the data processing device 110 or that he/she does not want advertisements transmitted to the data processing device 110. The conversion module 120 will then remove any sounds or advertisements embedded in the requested Web page (or other requested Internet content). Because HTML rendering and other advanced processing of Internet content/data is offloaded to the service 100 as described above, the data processing device 110 can be manufactured using a relatively low power microprocessor or microcontroller, thereby lowering the cost of manufacture and/or the energy consumed by the device 110.

In one embodiment, when a particular Web page or other Internet object has been converted into a format suitable for rendering/execution on the data processing device 110 the formatted page/object may be stored locally on a cache 125 maintained at the service 100. The next time the content is requested, the conversion module 120 may simply read the previously-generated code from the local cache 125 (i.e., it will no longer need to retrieve the content from remote locations to reconstruct the code).

Data Transport Prioritization

One embodiment of a system for prioritizing data transports (e.g., socket connections) is illustrated generally in FIG. 3. Two applications 390 and 391 executed on the data processing device 110 are shown communicating with two service modules 392 and 393, respectively, executed on the service 110. One socket connection, represented by sockets 310 and 312 in transport layers 305 and 306, respectively, provides for reliable data communication between application 390 and service 393. Similarly, a socket connection supported by sockets 311 and 313 provides for reliable data communication between application 391 and service 392.

In one embodiment, the transport layers 305 and 306 provide all, or a subset of, the standard TCP transport functions. In addition, the embodiment illustrated in FIG. 3 includes socket prioritization logic 330 and 331 which prioritizes socket connections based on a one or more characteristics of the applications for which they are generated. For example, sockets for interactive applications such as Web browsing and instant messaging may be assigned relatively high priorities whereas sockets for non-interactive applications such as automated software upgrades may be assigned relatively low priorities. By prioritizing sockets in this manner, background communication tasks such as automatic software upgrades may be conducted by the service 100 transparently to the end user.

Figure 4A:
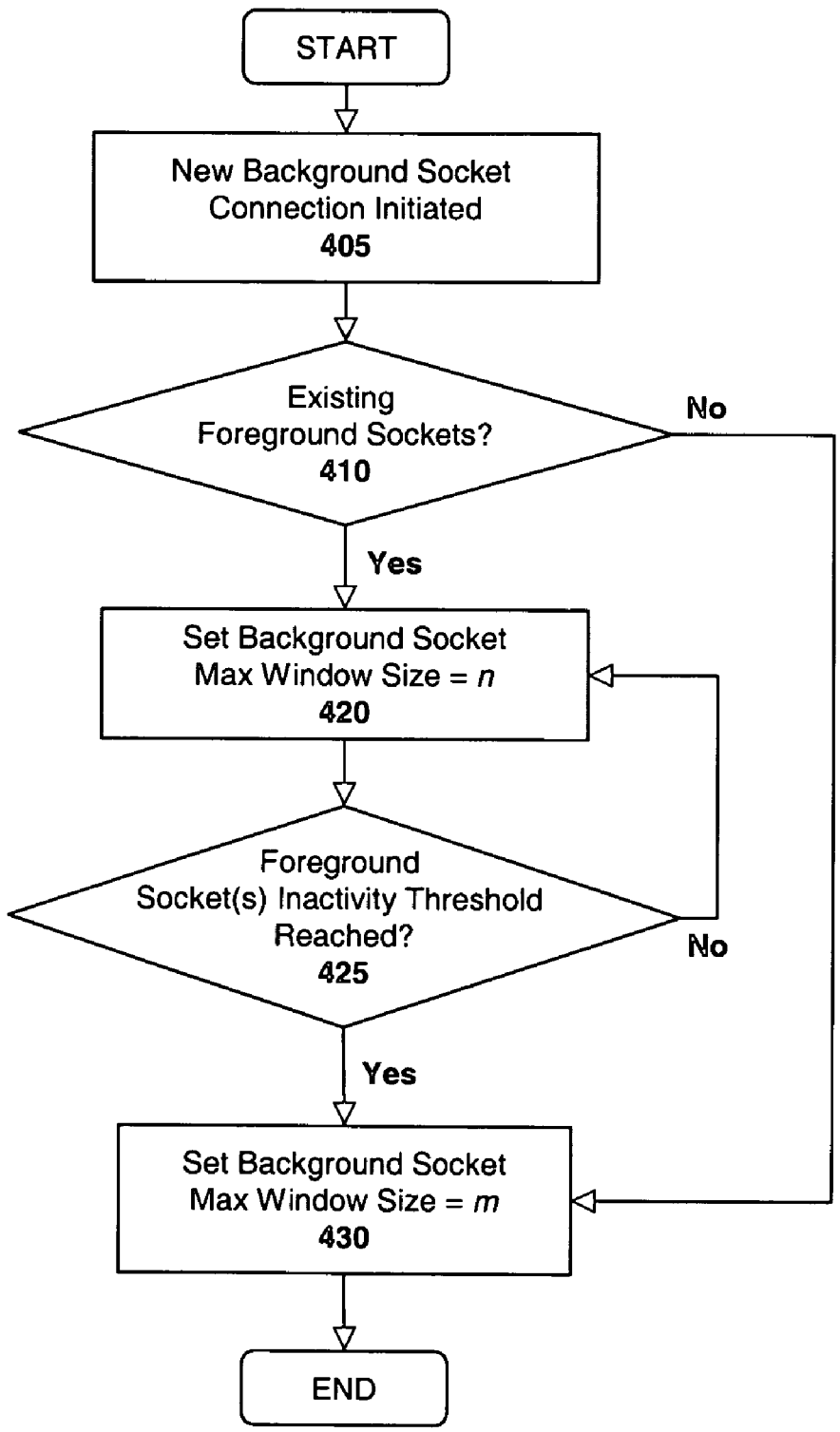
FIG. 4a illustrates one embodiment of a method for allocating bandwidth for new background sockets.
Figure 4B:
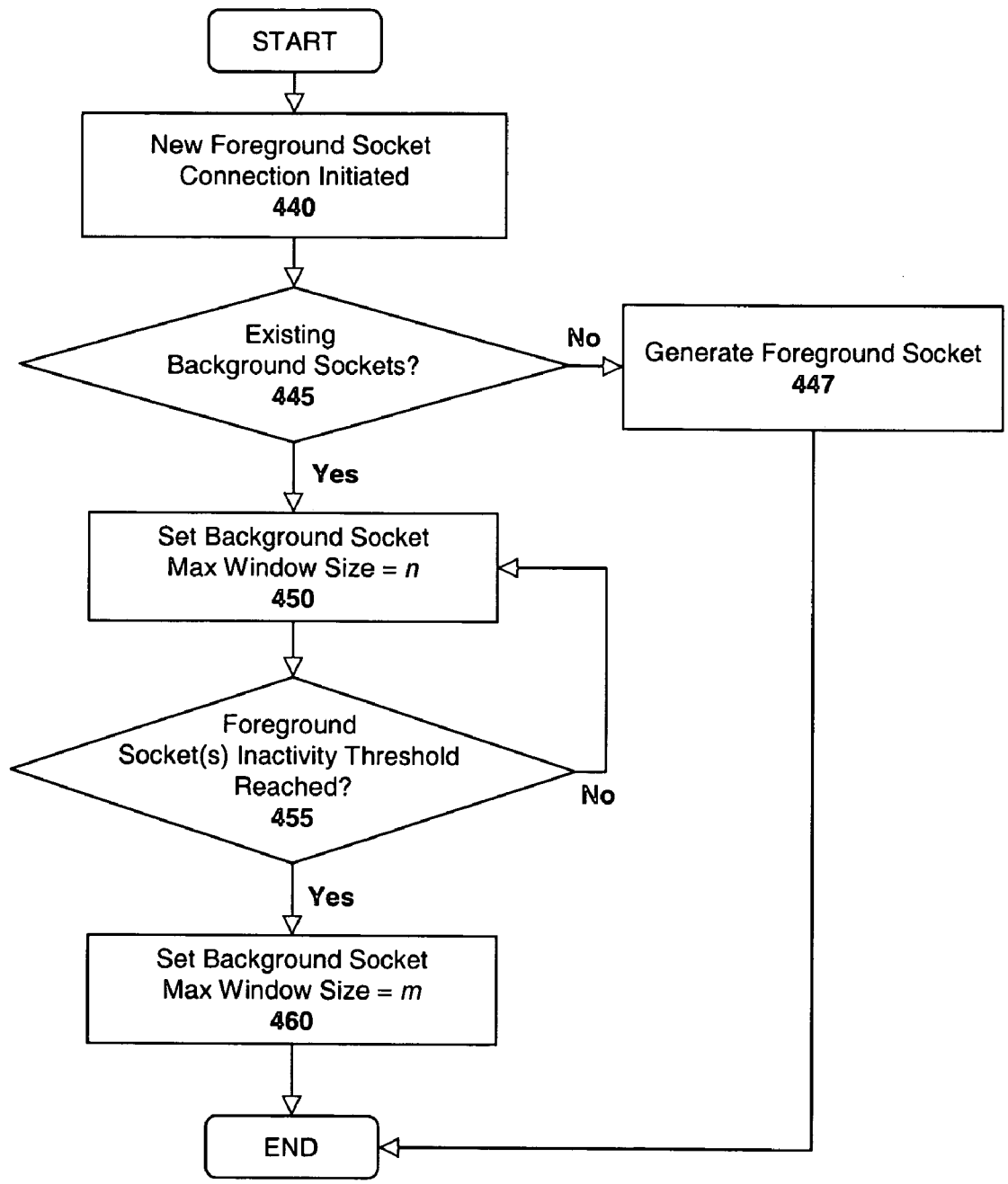
FIG. 4b illustrates one embodiment of a method for allocating bandwidth for new foreground sockets.
Figure 4C:
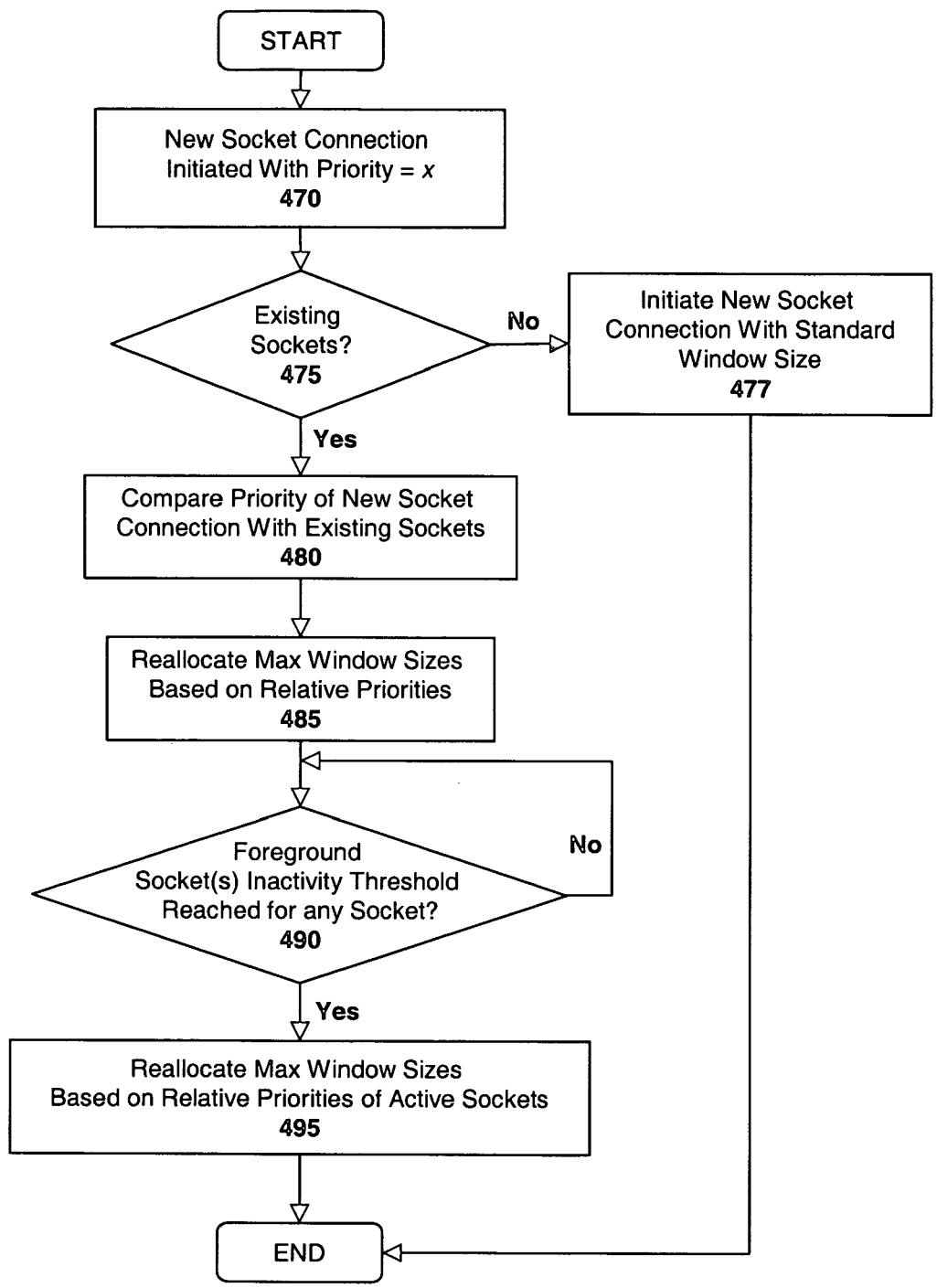
FIG. 4c illustrates one embodiment of a method for allocating bandwidth based on relative socket priority.

Three embodiments of methods for prioritizing data transports are illustrated in FIGS. 4a, 4b and 4c. These methods may be implemented by the specific system architecture illustrated in FIG. 3, or by a different system architecture. FIGS. 4a and 4b illustrate methods in which sockets are prioritized as either "background" sockets or "foreground" sockets. As used herein, "foreground" sockets are sockets generated for interactive applications (e.g., Web browsing, instant messaging, . . . etc) whereas "background" sockets are sockets generated for non-interactive (or less interactive) applications (e.g., software upgrades).

Referring to FIG. 4a, at 405, a new background socket connection is initiated for a non-interactive application. For example, a specified portion of the software or firmware on the data processing device may need to be upgraded by the service 100. In this case, a background socket connection (e.g., sockets 311, 313) may be established between an upgrade application on the device 110 (e.g., application 391) and an upgrade service module on the service 100 (e.g., service module 392).

At 410, the socket prioritization logic 330, 331 on the device 110 and/or the service 100, respectively, determines whether any foreground sockets are currently supporting interactive applications (e.g., application 390). If not, then at 430, a background socket is generated for the non-interactive application with a specified maximum window size ('m'). In one embodiment, the maximum window size may be set to the maximum size supported by the transport layer 305, 306 (e.g., 64 KB for standard TCP). In another embodiment, however, the maximum window size may be limited to a smaller value (e.g., 8 KB) so that, if/when the user begins performing interactive functions on the data processing device 110, the device can respond without an unreasonable delay (i.e., which might result if the device were required to wait for a maximum-sized window to be received before initiating the foreground socket).

At 410, if the socket prioritization logic 330, 331 determines that foreground sockets exist, then at 420, the background socket may be generated with a relatively smaller maximum window size ('n'). In one embodiment, the maximum window size n is set to zero. However, in another embodiment, the maximum window size may be set to a relatively small value (e.g., 2 KB).

Figure 5:
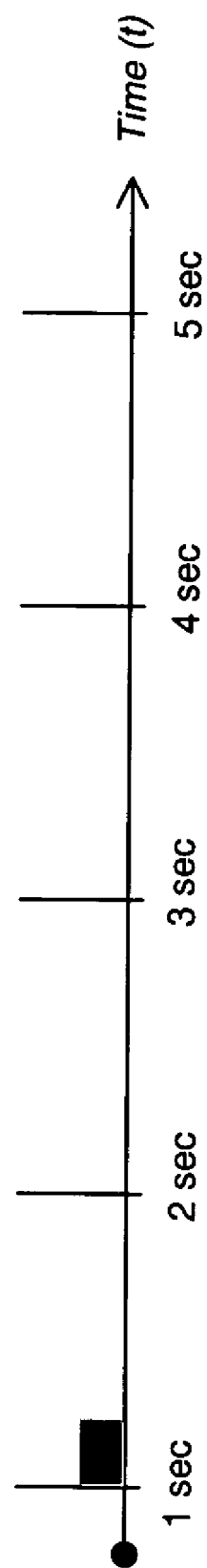
FIG. 5 illustrates a technique for allocating bandwidth to a socket by setting and resetting transport window size.

Moreover, in one embodiment, in order to allocate a specific percentage of the overall bandwidth to the background socket, the maximum window size for that socket may be reset to zero periodically. For example, if the total bandwidth available to the data processing device is 32 KB/sec, to allocate ¼ of the total bandwidth to a background socket, the socket prioritization logic 330, 331 may set the maximum window size to 8K once each second. When the 8K has been transmitted successfully (presumably in less than 1 second), the socket prioritization logic 330, 331 resets the maximum window size to zero until the beginning of the next second. This technique of precisely allocating a percentage of the overall bandwidth to a socket is illustrated graphically in FIG. 5. This bandwidth allocation technique may be employed at the various stages described herein where the maximum window size of a socket is set to a particular value (e.g., at 420 in FIG. 4*a*).

The socket prioritization logic 330, 331 may monitor the foreground socket connections to determine whether the user is still working interactively on the device 110. For example, in one embodiment, a foreground inactivity timer is reset to a threshold value (e.g., 30 seconds) each time the foreground socket is utilized (e.g., each time the user clicks on a new URL to a Web page). If the foreground socket is not utilized for the threshold period of time, determined at 425, then the maximum window size of the background socket may be increased (e.g., and reset to zero periodically based on the percentage of bandwidth to be allocated, as described above).

In the embodiment illustrated in FIG. 4*a*, the maximum window size is increased to 'm' if the inactivity threshold is reached (i.e., the value to which the maximum window size is set if no foreground sockets are initially detected). It should be noted, however, that the maximum window size may be increased to alternate values while still complying with the underlying principles of the invention. In one embodiment, the maximum window size may be increased incrementally over time, under the assumption that the longer the foreground socket is inactive, the less likely it is that the foreground socket will become active at any given point in time.

FIG. 4*b* illustrates a similar method for initiating a new foreground socket. At 440, the new foreground socket is initiated. If no background sockets exist, determined at 445, then at 447 the foreground socket is generated using a specified window size (e.g., 32 KB, 64 KB, . . . etc). If, however, background sockets exist, then the socket prioritization logic 330, 331 may reduce the bandwidth allocated to those sockets to free up bandwidth for the new foreground socket. Thus, at 450, the maximum window size for the background socket is set to 'n' and periodically reset to zero (as described above) to free up bandwidth. Once again, if the foreground socket becomes inactive, determined at 455, then the background socket window size may be reset to a larger value at 460 so that the background application can consume the additional, unused bandwidth.

In one embodiment of the invention, sockets are not strictly classified as "background" or "foreground" sockets as described above. Rather, sockets may be assigned a relative priority value (e.g., between 1 and 4) based on the level of interactivity of the applications which they support (or based on other specified variables).

One embodiment of a method for prioritizing socket connections in this manner is illustrated in FIG. 4*c*. At 470 a new socket connection is initiated with a specified priority ('x'). At 475, the socket prioritization logic 330, 331 determines whether any other active sockets exist. If not, then the new socket is initiated in a typical manner, using a specified window size at 477.

If, however, active socket connections exist between the device 110 and the service 100 (or a different client/server) then, at 480, the priorities of all of the socket connections are evaluated and, at 485, the maximum window sizes are reallocated based on the relative priorities of the active sockets. For example, if three sockets exist having relative priorities of 1, 2 and 3 (with 1 being the highest priority and 3 being the lowest) then the socket with a priority of 1 may be allocated a larger window size than the socket with a priority of 2, and the socket with a priority of 2 may be allocated a larger window size than the socket with a priority of 4. If the maximum available bandwidth is 64 KB/sec, then the highest priority (1) socket may be allocated, for example, a 40 KB window, the lowest priority (3) socket may be allocated an 8 KB window and the socket with an intermediate priority (2) may be allocated a 16 KB window. If each socket is reset to zero each second as described above, then the 64 KB/sec bandwidth will be accurately divided among the sockets based on relative priority. In one embodiment, however, the highest priority socket may not be periodically reset to zero as described, so that it will be provided with the maximum available bandwidth.

Once again, if a particular socket becomes inactive for a predetermined period of time (e.g., because a user stops interactively working on an application), determined at 490, then, at 495, the window sizes for the remaining active sockets may be reallocated based on their relative priorities (as described above).

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media suitable for storing or transmitting electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while embodiments of the invention described above operate at the TCP transport layer, the underlying principles of the invention are not limited to any particular data transport or any particular network layer. Moreover, while described above in the context of a data processing device 110 communicating with a data service 100, the underlying principles of the invention may be employed between virtually any two nodes communicating over a data network. Accordingly, the scope and spirit of the invention should be judged in terms of the claims which follow.

What is claimed is:

1. A method implemented on a data processing device communicatively coupled to a network comprising:
    associating interactive applications with a first type of socket connection and non-interactive applications with a second type of socket connection;
    in response to detecting that an interactive application needs to transmit or receive data over the network, opening a first socket connection of the first type for the interactive application and allocating a first amount of bandwidth to the first socket connection by setting a maximum data transport window size for the first socket connection to a first value;
    in response to detecting that a non-interactive application needs to transmit or receive data over the network, opening a second type of socket connection for the non-interactive application and allocating a second amount of bandwidth to the second socket connection by periodically setting a maximum data transport window size for the second socket connection to a second value and then resetting the maximum data transport window size to a third value once a specified amount of data has been transmitted, wherein the third value is less than the first value and the second value, and further wherein the second socket connection remains open concurrently with the first socket connection, and further wherein the second value is related to how many concurrent socket connections exist when the second socket connection is initially opened and a priority associated with each concurrent socket connection;
    in response to detecting that a first type of socket connection is no longer being used by the interactive application, automatically increasing the second amount of bandwidth to the second socket connection by increasing the maximum data transport window size for the second socket connection; and
    in response to detecting that a first type of socket connection is again being used by the interactive application, automatically decreasing the second amount of bandwidth to the second socket connection by again periodically setting a maximum data transport window size for the second socket connection to the second value and then resetting the maximum data transport window size to a third value once a specified amount of data has been transmitted, wherein the third value is less than the first value and the second value,
    wherein the increasing the second amount of bandwidth to the second socket connection automatically increases the maximum data transport window size of the second socket connection after each of a plurality of successive predetermined time intervals and automatically reset the maximum data transport window size of the second socket connection upon transmitting the second-maximum data window size amount of data over the second socket connection.

2. The method as in claim 1 wherein the specified amount of data is equal to said second data transport window size and wherein the third data transport window size is equal to zero.

3. The method as in claim 1 further comprising:
    when a first type of socket connection is being used, maintaining the second amount of bandwidth allocated to the second socket connection by periodically resetting said second maximum data transport window size to zero.

4. The method as in claim 1 further comprising:
    resetting said second maximum data transport window size to zero once data from said second data transport window has been successfully received, and then periodically resetting said second maximum data transport window size for said second socket connection to said second value.

5. The method as in claim 1 wherein said first and second socket connections are Transmission Control Protocol ("TCP") socket connections.

6. The method as in claim 1 wherein said interactive application is a Web browser application and said non-interactive application is an automated software upgrade application.

7. A system for allocating bandwidth comprising:
    a transport layer to support a first socket connection for a first application and a second socket connection for a second application, wherein the second socket connection remains open concurrently with the first socket connection; and
    a socket prioritization module to allocate relatively more bandwidth to said first socket connection relative to said second socket connection by using a larger maximum data transport window size for the first socket connection than the maximum data transport window size used for the second socket connection, wherein allocation of bandwidth by the socket prioritization module is in response to detecting that the second application needs to transmit or receive data over a network, based on one or more characteristics of said first application and said second application, and automatically increases the maximum data transport window size of the second socket connection after each of a plurality of successive predetermined time intervals and automatically resets the maximum data transport window size of the second socket connection upon transmitting the second-maximum data window size amount of data over the second socket connection, wherein the maximum data transport window size used for the second socket connection is related to how many concurrent socket connections exist when the second socket connection is initially opened and a priority associated with each concurrent socket connection.

8. The system as in claim 7 wherein after transmitting the maximum data window size amount of data over the second socket connection, the maximum data window size is set to zero.

9. The system as in claim 7 wherein allocating bandwidth for said first socket connection comprises initially setting a first maximum data transport window size for said first socket connection to a first value; and wherein allocating bandwidth for said second socket connection comprises initially setting a second maximum data transport window size for said second socket connection to a second value which is smaller than said first value, resetting said second maximum data transport window size to zero each time data from said second socket has been successfully received and then periodically resetting said second maximum data transport window size to said second value.

10. The system as in claim 7 wherein said first and second socket connections are Transmission Control Protocol ("TCP") socket connections.

11. The system as in claim 7 wherein a characteristic of said first application is that it is a user-interactive network application and wherein a characteristic of said second type of application is that it is a non-interactive network application.

12. The system as in claim 11 wherein said first application is a Web browser application and said second application is an automated software upgrade application.

13. A method comprising:
in response to detecting that an application needs to transmit or receive data over a network, initiating a new socket connection within a network transport layer on a data processing device;
determining whether any other socket connections are active on said data processing device;
comparing a priority value associated with said new socket connection with said active socket connections; and in further response to detecting that the application needs to transmit or receive data over the network, decreasing bandwidth to an active socket connection of said active socket connections if said priority value associated with said new socket connection is higher relative to said active socket connection, wherein decreasing bandwidth includes automatically decreasing a maximum data window size of the active socket connection after each of a plurality of predetermined time intervals; and automatically resetting the maximum data window size of the active socket connection upon transmitting the bandwidth of the active socket of data over the active socket connection, and further wherein the maximum data window size is related to how many other active socket connections exist when the active socket connection is initially opened and the Priority value associated with the active socket connection and each of the other active socket connections.

14. The method as in claim 13 wherein reallocating bandwidth comprises dynamically adjusting maximum transport window sizes for active socket connection.

15. The method as in claim 14 wherein dynamically adjusting comprises:
limiting bandwidth for a first socket connections relative to said active socket connections by providing said first socket connection with a relatively smaller transport window size and/or by resetting said transport window size to zero for said transport window after all data contained in said active socket connection has been received and then periodically resetting said transport window back to said relatively smaller transport window size.

16. The method as in claim 15 further comprising:
providing a standard maximum transport window size for said active socket connection and not resetting said maximum transport window sizes to zero for said active socket connection.

17. The method as in claim 13 wherein said transport layer is a Transmission Control Protocol ("TCP") transport layer.

* * * * *